(12) United States Patent
Huang et al.

(10) Patent No.: US 10,070,395 B2
(45) Date of Patent: Sep. 4, 2018

(54) ADAPTIVE POWER CONFIGURATION METHOD AND CORRESPONDING BASE STATIONS IN A HETNET

(75) Inventors: Haiyang Huang, PuDong Jinqiao Shanghai (CN); Qi Jiang, PuDong Jinqiao Shanghai (CN); Wu Zheng, PuDong Jinqiao Shanghai (CN); Gang Shen, PuDong Jinqiao Shanghai (CN); Jiming Chen, PuDong Jinqiao Shanghai (CN)

(73) Assignee: Alcatal Lucent, Boulogne-Billancourt (FR)

( * ) Notice: Subject to any disclaimer, the term of this patent is extended or adjusted under 35 U.S.C. 154(b) by 45 days.

(21) Appl. No.: 13/995,758

(22) PCT Filed: Nov. 8, 2011

(86) PCT No.: PCT/IB2011/003212
§ 371 (c)(1),
(2), (4) Date: Jun. 19, 2013

(87) PCT Pub. No.: WO2012/085661
PCT Pub. Date: Jun. 28, 2012

(65) Prior Publication Data
US 2013/0281150 A1    Oct. 24, 2013

(30) Foreign Application Priority Data

Dec. 23, 2010 (CN) .......................... 2010 1 0610975

(51) Int. Cl.
*H04W 52/24* (2009.01)
*H04W 52/32* (2009.01)
(Continued)

(52) U.S. Cl.
CPC ....... *H04W 52/244* (2013.01); *H04W 52/325* (2013.01); *H04W 52/367* (2013.01);
(Continued)

(58) Field of Classification Search
None
See application file for complete search history.

(56) References Cited

U.S. PATENT DOCUMENTS

| | | | |
|---|---|---|---|
| 6,405,021 B1 * | 6/2002 | Hamabe | H04W 52/362 370/318 |
| 2008/0318611 A1 * | 12/2008 | Baker et al. | 455/522 |

(Continued)

FOREIGN PATENT DOCUMENTS

| | | | |
|---|---|---|---|
| JP | 2010-114778 A | 5/2010 | |
| JP | 2011518519 A | 6/2011 | |

(Continued)

OTHER PUBLICATIONS

Fujitsu, "Consideration on enhanced ICIC schemes for data channel in HetNet," 3rd Generation Partnership Project (3GPP), 3GPP TSG RAN WG1 Meeting #62bis, R1-105681, XP050450780, pp. 1-4, Xian, China, Oct. 11-15, 2010.

(Continued)

*Primary Examiner* — Dong-Chang Shiue
(74) *Attorney, Agent, or Firm* — Fay Sharpe, LLP (57) ABSTRACT

The present invention provides a novel adaptive power configuration method and corresponding base stations in a Het Net. According to the present invention, some specific subframes of a serving base station are scheduled to serve victim UEs, while the corresponding subframes of an aggressor base station can be scheduled to serve its UEs with adaptively adjusting the transmit power instead of thoroughly muting. This adaptive power configuration scheme can efficiently reduce the interference in Het Nets to guarantee the workability of victim UEs, meanwhile more capacity performance gain can be achieved with backward compatibility to legacy UEs.

19 Claims, 5 Drawing Sheets

(51) Int. Cl.
*H04W 52/36* (2009.01)
*H04W 8/24* (2009.01)
*H04W 52/14* (2009.01)
*H04W 72/12* (2009.01)
*H04W 52/38* (2009.01)
*H04W 28/04* (2009.01)

(52) U.S. Cl.
CPC .............. *H04W 8/24* (2013.01); *H04W 28/04* (2013.01); *H04W 52/143* (2013.01); *H04W 52/38* (2013.01); *H04W 72/12* (2013.01)

(56) References Cited

U.S. PATENT DOCUMENTS

| | | | | |
|---|---|---|---|---|
| 2009/0042596 | A1* | 2/2009 | Yavuz | H04W 52/40 455/522 |
| 2009/0252077 | A1* | 10/2009 | Khandekar et al. | 370/312 |
| 2009/0264077 | A1* | 10/2009 | Damnjanovic | 455/63.1 |
| 2009/0286496 | A1* | 11/2009 | Yavuz | H04W 52/241 455/127.1 |
| 2010/0278132 | A1 | 11/2010 | Palanki et al. | |
| 2011/0086663 | A1* | 4/2011 | Gorokhov et al. | 455/522 |
| 2011/0201277 | A1 | 8/2011 | Eguchi | |

FOREIGN PATENT DOCUMENTS

| | | |
|---|---|---|
| JP | 2011521512 A | 7/2011 |
| WO | 2009126586 A2 | 10/2009 |
| WO | 2009129413 A2 | 10/2009 |

OTHER PUBLICATIONS

International Search Report for PCT/IB2011/003212 dated Mar. 1, 2012.
English Bibliography for Japanese Patent Application Publication No. JP2010114778A, published May 20, 2010, printed from Thomson Innovation on Jul. 22, 2014, 4 pp.
English Bibliography for Japanese Patent Application Publication No. JP2011518519A, published Jun. 23, 2011, printed from Thomson Innovation on May 30, 2015, 4 pp.
English Bibliography for Japanese Patent Application Publication No. JP2011521512A, published Jul. 21, 2011, printed from Thomson Innovation on May 30, 2015, 5 pp.
PCT Pat App No. PCT/IB2011/003212, Written Opinion of the International Searching Authority, dated Mar. 1, 2012, 7 pp.

* cited by examiner

ADAPTIVE POWER CONFIGURATION METHOD AND CORRESPONDING BASE STATIONS IN A HETNET

FIELD OF THE INVENTION

The present invention relates to mobile communication technologies, and particularly to an adaptive power configuration method and corresponding base stations in a HetNet in a mobile communication network.

BACKGROUND OF THE INVENTION

With increasing demand for high quality data services in modern wireless communications, it is more and more difficult to support required data capacity via conventional cell splitting techniques, which require additional macro evolved NodeBs (eNBs) for deployment. Actually, operators can make use of low power nodes, including remote radio heads, pico eNBs, home eNBs (HeNBs) and relay nodes, as a complement to enhance system coverage and capacity performance. And we refer to a network deployment incorporating one or more small-power nodes as mentioned above into the conventional macro eNB as a heterogeneous network (HetNet).

Figure 1A:
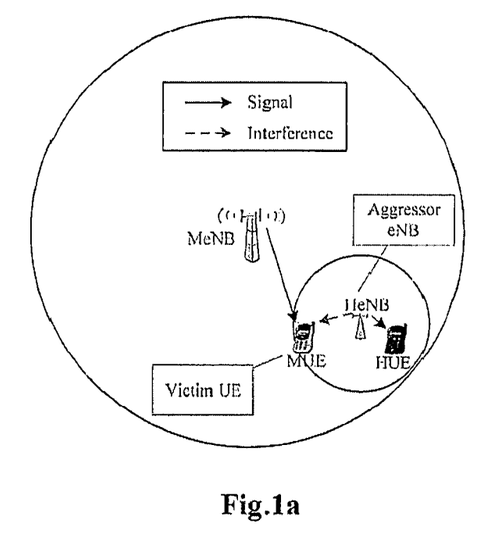
FIGS. 1a and 1b illustrate a schematic view of two downlink network deployment in a heterogeneous network, respectively.
Figure 1B:
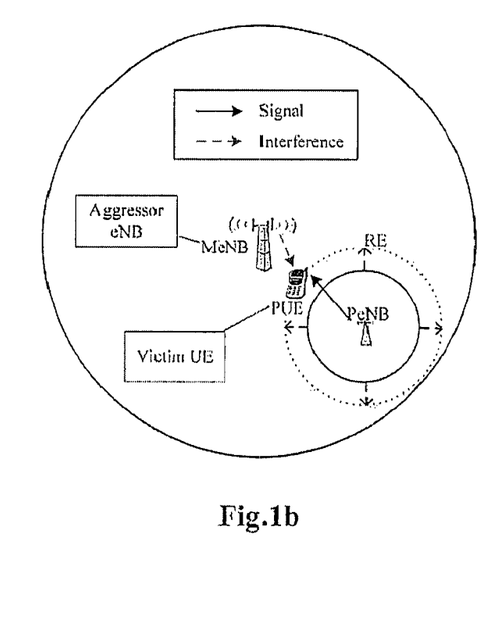

As one of the current hottest research topics, however, HetNet gives rise to strong interference problem in the overlapped coverage area between different nodes with co-channel deployment, which will seriously degrade the performance of victim user equipments (UEs) so that they are even unworkable in practice. The most severe interference scenarios in HetNets include two deployments in downlink (DL). The first is the Macro-HeNB deployment, shown in FIG. 1(a), wherein the MeNB denotes a macro eNB without the closed subscriber group (CSG) configuration, the HeNB denotes a home eNB with closed subscriber group (CSG) configuration, and the HUE denotes a UE served by the home eNB. In this deployment, the macro UE (MUE) being in close proximity of the HeNB and served by the macro eNB suffers the severe interference from the HeNB (since the restriction of CSG, the macro UE served by the macro eNB can not access to the HeNB via handover). The second is the Macro-PeNB deployment, shown in FIG. 1(b), where if the range expansion (RE) cell association with large bias is employed for enhancement of edge UE performance, load balancing, etc., the pico UE (PUE) served by the PeNB will suffer severe interference from signal transmitted by the macro eNB. Here the victim UE connects to the pico eNB, although at the viewpoint of the victim UE, the DL signal power from pico eNB is much lower than that from the macro eNB. The "aggressor eNB" means that its transmitted signal is regarded as the interference to the victim UE.

Moreover, several researches indicate that the interference problem of control channels (CCHs, including PDCCH, PCFICH, and PHICH) should be solved prior to that of the data channels because of the much more importance to guarantee signal reception. Besides, considering the inherent property of CCHs, it is almost impossible to use on the CCHs a resource block (RB)-level interference coordinated scheduling technique that copes with data channel interference problem conventionally.

Currently, considering the interference mitigation performance and backward compatibility to the legacy UEs, the most efficient existing solutions include almost blank subframe scheme and DL transmit power control scheme.

Figure 2:
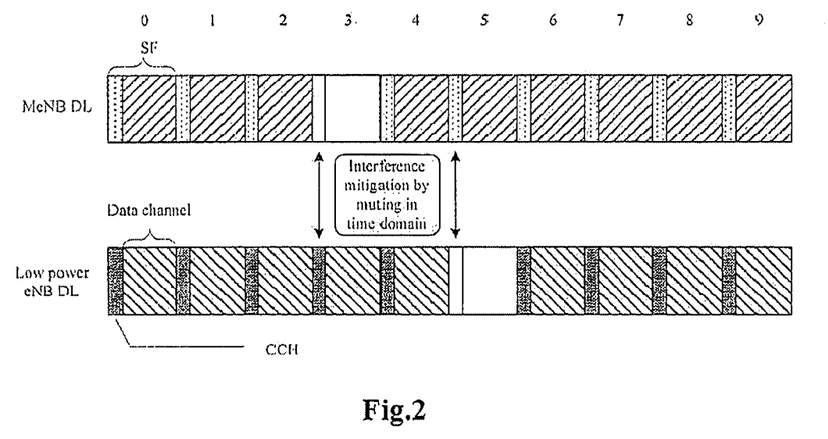
FIG. 2 illustrates a schematic view of subframe scheduling of an almost blank subframe scheme.

The basic idea of the almost blank subframe scheme is depicted in FIG. 2, where the "low power eNB" denotes HeNB or pico eNB. For interference mitigation, the aggressor eNB thoroughly mutes CCHs of certain DL subframes to avoid the time-frequency resource conflict to corresponding involved eNB and the victim UEs can only be scheduled into these specific subframes of serving eNB, e.g., the victim UEs served by the macro eNB are scheduled into SF 5 and the victim UEs served by low power eNB are scheduled into SF 3, respectively; while the non-victim UEs can share all other subframes of corresponding eNB for scheduling except the muted ones. Moreover, the data channels of these CCH-muted subframes are nulled either. It is noted that, however, these almost blank subframes can not be scheduled for the UEs served by aggressor eNB in any case. Therefore, this will result in a system performance loss, and it becomes more serious especially when the number of UEs served by the aggressor eNB is increasing.

Figure 3:
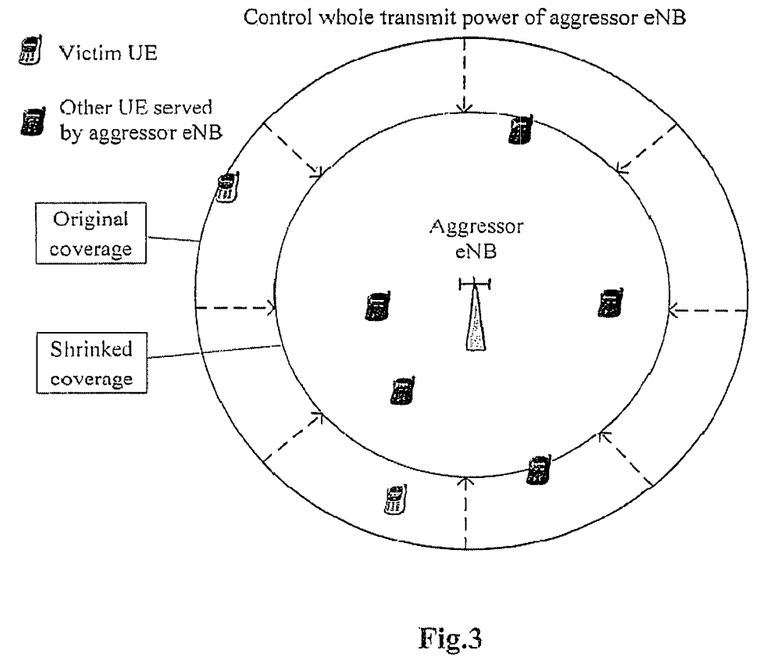
FIG. 3 illustrates a schematic view of a network deployment of a DL transmit power control scheme.

According to certain criterion, the DL transmit power control scheme simply lowers the whole transmit power of aggressor eNB without subframe-specific consideration to avoid severe interference to the signal from serving eNB, depicted in FIG. 3. Obviously, the serving coverage of the power-adjusted aggressor eNB decreases accordingly. Therefore it can guarantee the workability of victim UEs to some extent, but there is much capacity performance loss of its normally served UEs inevitably.

SUMMARY OF THE INVENTION

In order to overcome the above drawbacks in the prior art, the present invention proposes a novel adaptive power configuration method and corresponding base stations in a HetNet. According to the present invention, some specific subframes of a serving base station are scheduled to serve victim UEs, while the corresponding subframes of an aggressor base station can be scheduled to serve its UEs with adaptively adjusting the transmit power instead of thoroughly muting. This adaptive power configuration scheme can efficiently reduce the interference in HetNets to guarantee the workability of victim UEs, meanwhile more capacity performance gain can be achieved with backward compatibility to legacy UEs Specifically, according to an embodiment of the present invention, there is provided an adaptive power configuration method in a HetNet, the HetNet comprising a serving base station, an aggressor base station, victim UEs served by the serving base station but interfered by the aggressor base station, and non-victim UEs served by the aggressor base station, the method comprising:

specific subframes of the serving base station are scheduled to serve the victim UEs, the victim UEs report their interference situation information to the serving base station;

the serving base station transfers the interference situation information of the victim UEs to the aggressor base station;

the aggressor base station calculates its possible maximum transmit power P on the specific subframes, wherein P is in a range from 0 to Pmax, and Pmax is a maximal transmit power of the aggressor base station;

the aggressor base station transmits the signal on the specific subframes with the transmit power being P.

According to an alternative embodiment of the present invention, the step c) is that the serving base station calculates the possible maximum transmit power P of the aggressor base station on the specific subframes, wherein P is in a range from 0 to Pmax, and Pmax is the maximal transmit power of the aggressor base station; the step d) is that that serving base station transfers a power configuration indication of the possible maximum transmit power P of the aggressor base station on the specific subframes to the aggressor base station.

According to an alternative embodiment of the present invention, the specific subframes are coordinated and controlled by the aggressor base station and the serving base station.

According to an alternative embodiment of the present invention, criteria for calculating the possible maximum transmit power P of the aggressor base station on the specific subframes is: keeping the victim UEs normally workable, obtaining a reliable control channel reception, and meanwhile enabling the non-victim UEs to obtain a high performance gain.

According to an alternative embodiment of the present invention, information interaction is carried out between the aggressor base station and the serving base station via an X2 interface.

According to an alternative embodiment of the present invention, the aggressor base station is a HeNB, and the serving eNB is a macro eNB.

According to an alternative embodiment of the present invention, the aggressor base station is a macro eNB, and the serving base station is a pico eNB.

According to an embodiment of the present invention, there is a provided a serving base station working in a HetNet, the HetNet comprising an aggressor base station, victim UEs served by the serving base station but interfered by the aggressor base station, and non-victim UEs served by the aggressor base station, characterized in that, the serving base station comprising:

a receiving unit configured to receive interference situation information from the victim UEs;

a transmitting unit configured to transmit the interference situation information to the aggressor base station.

According to an alternative embodiment of the present invention, the serving base station further comprising: a calculating unit configured to calculate a possible maximum transmit power P of the aggressor base station on the specific subframes, wherein P is in a range from 0 to Pmax, and Pmax is a maximal transmit power of the aggressor eNB; the transmitting unit is configured to transmit a power configuration indication of the possible maximum transmit power P of the aggressor base station on the specific subframes to the aggressor base station, instead of transmitting the interference situation information from the victim UEs.

According to an alternative embodiment of the present invention, criteria for calculating the possible maximum transmit power P of the aggressor base station on the specific subframes is: keeping the victim UEs normally workable, obtaining a reliable control channel reception, and meanwhile enabling the non-victim UEs to obtain a high performance gain.

According to an embodiment of the present invention, there is provided an aggressor base station working in a HetNet, the HetNet further comprising a serving base station, victim UEs served by the serving base station but interfered by the aggressor base station, and non-victim UEs served by the aggressor base station, characterized in that the aggressor base station comprising:

a receiving unit configured to receive the possible maximum transmit power P of the aggressor base station on the specific subframes from the serving base station, wherein P is in a range from 0 to Pmax, and Pmax is a maximal transmit power of the aggressor base station;

a power adjusting unit configured to adjust the transmit power of the specific subframes as P.

According to an alternative embodiment of the present invention, the receiving unit is configured to receive the interference situation information of the victim UEs from the serving base station, instead of receiving the possible maximum transmit power P of the aggressor base station on the specific subframes;

further, the aggressor base station comprising a calculating unit configured to calculate the possible maximum transmit power P of the aggressor base station on the specific subframes, wherein P is in a range from 0 to Pmax, and Pmax is the maximal transmit power of the aggressor base station.

According to an alternative embodiment of the present invention, criteria for calculating the possible maximum transmit power P of the aggressor base station on the specific subframes is: keeping the victim UEs normally workable, obtaining a reliable control channel reception, and meanwhile enabling the non-victim UEs to obtain a high performance gain.

BRIEF DESCRIPTION OF THE ACCOMPANYING DRAWINGS

The other objectives and effects of the present invention will become much clearer and easier to understand with more comprehensive understanding on the present invention in conjunction with the explanations of the following accompanying drawings, wherein.

In all of the above figures, the same reference numbers denote the same, like or corresponding features or functions.

DETAILED DESCRIPTION OF THE PREFERRED EMBODIMENTS

Embodiments of the present invention will be described in detail with reference to the figures.

Below is given a specific example about applying the proposed scheme to the Macro-HeNB deployment scenario (FIG. 1a), wherein the HeNB is the aggressor base station while the macro eNB is the serving base station. When the non-CSG macro UEs are in close proximity of the HeNB, the received signal from the macro eNB may be weaker than that from the HeNB. Further, the macro UEs can not access to the HeNB via handover since the CSG restriction. Therefore the HeNB DL signal severely interferes to the DL signal from the macro eNB with regard to these victim macro UEs.

Figure 4A:
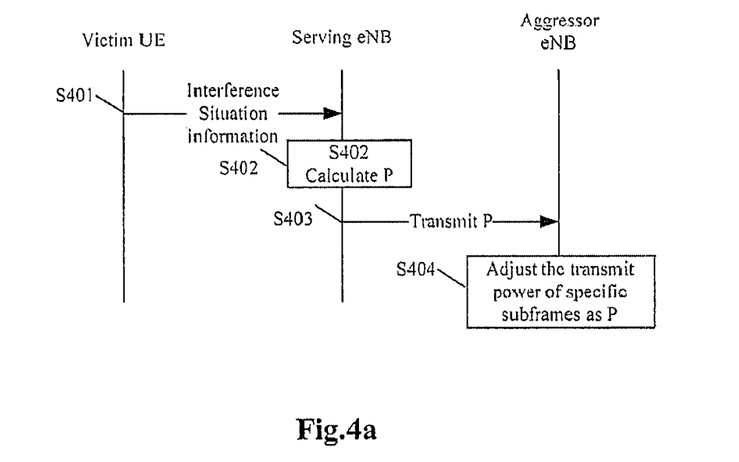
FIGS. 4a and 4b illustrate a flow chart of adaptive specific subframe power configuration according to an embodiment of the present invention, respectively.
Figure 4B:
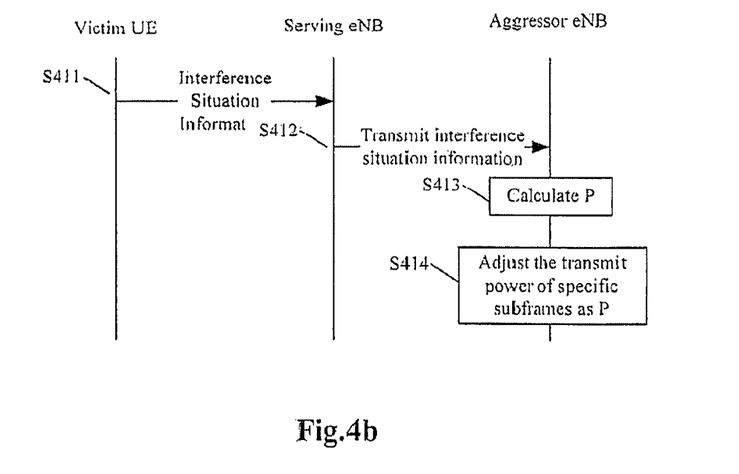

FIG. 4 illustrates a flow chart of an adaptive specific subframe power configuration according to an embodiment of the present invention.

FIG. 4a illustrates a flow chart of an adaptive specific subframe power configuration where the serving base station calculates a possible maximum transmit power of the aggressor base station on specific subframes. Specifically, at step S401, the victim macro UEs report the situation of their interferences to the macro eNB; at step S402, the macro eNB calculates the possible maximum transmit power P of the HeNB on the specific subframes, and at step S403, the power configuration indication is transferred to the HeNB; at step S404, the HeNB adjusts the transmit power on the specific subframes as P, wherein P is in a range from 0 to Pmax, and Pmax is a maximal transmit power of the aggressor base station.

FIG. 4b illustrates a flow chart of an adaptive specific subframe power configuration where the aggressor base station calculates the possible maximum transmit power of the aggressor base station on the specific subframes. Specifically, at step S411, the victim macro UEs report the situation of their interferences to the macro eNB; at step S412, the macro eNB conveys the reported information to the HeNB, at step S413, based on this reported information, the HeNB calculates its own possible maximum transmit power P on the specific subframes; at step S414, the HeNB adjusts the transmit power on the specific subframes as P, wherein P is in a range from 0 to Pmax, and Pmax is the maximal transmit power of the aggressor base station.

Based on the operations mentioned above, data of the victim macro UEs can be scheduled only on the specific subframes of the macro eNB while the CSG UEs have a possibility to be scheduled to all the subframes of the HeNB. The selection of specific subframes is controlled by network operation with coordinated negotiation between the two involved eNBs. Considering the latency of coordination information exchanging, an X2 interface between the two involved eNBs is preferable, but not mandatory.

The transmit power configured by RRC should make tradeoff among many factors, such as the interference situation of victim macro UEs as well as signal receiving situation of the CSG UEs. Trying to keep the victim macro UEs normally workable (lower the CCH outage probability to an acceptable level) and achieving capacity performance gain of the CSG UEs are the baseline consideration of the present invention. Therefore, the criteria for calculating the possible maximum transmit power P of the aggressor base station on specific subframes is: trying to guarantee the victim UEs normally workable, obtaining a reliable control channel reception, and meanwhile trying to reduce performance loss of the served UEs caused by the aggressor base station transmit power restriction. That is to say, the victim UEs are guaranteed normally workable with a relatively high probability (the reliable reception of the control channel is crucial), and meanwhile, it is undesired that this adjustment mechanism causes the overall performance of the UEs served by the aggressor base station to lose too much so as to ensure the overall performance gain advantage of the UEs in the whole network. In practical application, due to the variation of UE deployment and mobility, the power control based on "specific subframes" can adaptively adjust according to factors such as channel change speed, UE moving speed and interface interacting supporting capability.

Figure 5:
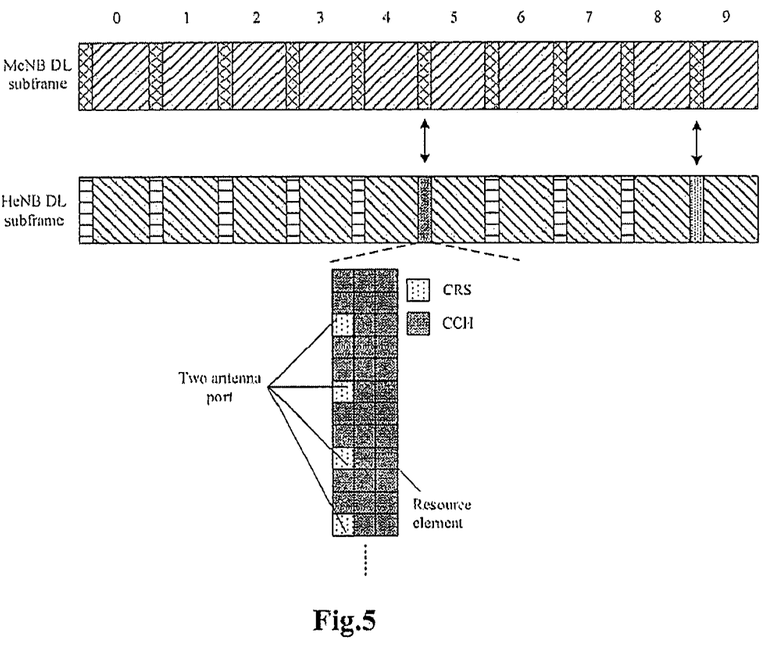
FIG. 5 illustrates a schematic view of an aggressor base station downlink subframe power configuration according to an embodiment of the present invention.

FIG. 5 illustrates a schematic view of an aggressor base station downlink subframe power configuration according to an embodiment of the present invention. On the downlink frame of the HeNB (which is the aggressor base station in the present embodiment), the subframe 5 and subframe 9 serve as specific subframes, and have a power configuration on the control channels different from other subframes. Furthermore, power configuration in different specific subframes is also different. The method described in the present invention can only be with respect to the control channels of the subframes (the control channels cannot implement interference coordination by virtue of flexible resource block scheduling as the data channels can do). In fact, the interference mitigation of the data channels of these specific subframes can employ either the present method or other methods, which is not strictly restricted. In one word, according to the present invention, since these specific subframes do not need to thoroughly close transmission as in the almost black subframe scheme, it provides possibility for enhancement of overall performance of the UEs served by the aggressor base station on the premise of trying to ensure workable of the victim UEs.

As shown in FIG. 5, in order to ensure backward compatibility for 3GPP Rel-8/9 terminals, as an optional solution, it is not suggested that REs (resource elements) occupied by CRS (cell-specific reference signal) be subjected to power adjustment.

Figure 6:
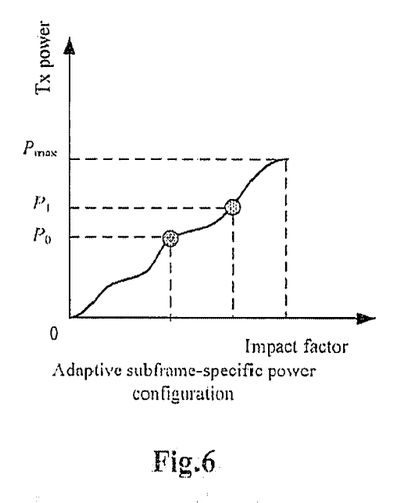
FIG. 6 illustrates a schematic view of an adaptive specific subframe power configuration according to an embodiment of the present invention.

FIG. 6 illustrates a schematic view of an adaptive specific subframe power configuration according to an embodiment of the present invention. The possible maximum transmit power of the subframe 5 in FIG. 5 is shown as P0; the possible maximum transmit power of the subframe 9 in FIG. 5 is shown as P1 in FIG. 6. The transmit power on these specific subframes of the HeNB will adaptively vary from 0 to Pmax (the possible maximum transmit power of the HeNB on the specific subframes).

Figure 7:
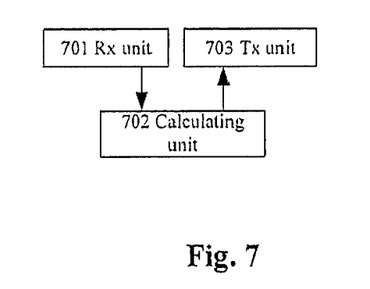
FIG. 7 illustrates a schematic view of a structure of a serving base station according to an embodiment of the present invention.

FIG. 7 illustrates a schematic view of a structure of a serving base station according to an embodiment of the present invention. In this embodiment, the serving base station 700 comprises a receiving unit 701, a calculating unit 702 and a transmitting unit 703.

Specifically, the receiving unit 701 is configured to receive interference situation information from victim UEs, the calculating unit 702 is configured to calculate a possible maximum transmit power P of the aggressor base station on the specific subframes, wherein P is in a range from 0 to Pmax, and Pmax is the maximal transmit power of the aggressor base station; the transmitting unit 703 is configured to transmit a power configuration indication of the possible maximum transmit power P of the aggressor base station on the specific subframes to the aggressor base station.

In another embodiment of the present invention, the serving base station comprises the receiving unit 701 and the transmitting unit 703, wherein the receiving unit 701 is configured to receive interference situation information from the victim UEs; the transmitting unit 703 is configured to transmit interference situation information received from the victim UEs to the aggressor base station.

Figure 8:
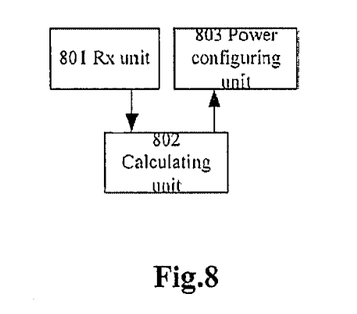
FIG. 8 illustrates a schematic view of a structure of an aggressor base station according to an embodiment of the present invention.

FIG. 8 illustrates a schematic view of a structure of an aggressor base station according to an embodiment of the present invention. In this embodiment, the aggressor base station 800 comprises a receiving unit 801, a calculating unit 802 and a power configuring unit 803.

Specifically, the receiving unit 801 is configured to receive interference situation information of victim UEs from the serving base station, the calculating unit 802 is configured to calculate the possible maximum transmit power P of the aggressor base station on the specific subframes, wherein P is in a range from 0 to Pmax, and Pmax is the maximal transmit power of the aggressor base station; the power adjusting unit 803 is configured to adjust the transmit power of the specific subframes as P.

In another embodiment of the present invention, the aggressor base station comprises the receiving unit 801 and the power adjusting unit 803, wherein the receiving unit 801 is configured to receive the possible maximum transmit power P of the aggressor base station on the specific subframes from the serving base station instead of receiving the interference situation information of the victim UEs from the serving base station, wherein P is in a range from 0 to Pmax, and Pmax is the maximal transmit power of the aggressor base station; the power adjusting unit 803 is configured to adjust the transmit power of the specific subframes as P.

In the above embodiment, the criteria for calculating the possible maximum transmit power P of the aggressor base station on specific subframes is: trying to guarantee the victim UEs normally workable, obtaining a reliable control channel reception, and meanwhile trying to reduce performance loss of the served UEs caused by the aggressor base station transmit power restriction. That is to say, the victim UEs are guaranteed normally workable with a relatively high probability (the reliable reception of the control channel is crucial), and meanwhile, it is undesired that this adjustment mechanism causes the overall performance of the UEs served by the aggressor base station to lose too much so as to ensure the overall performance gain advantage of the UEs in the whole network. In practical application, due to the variation of UE deployment and mobility, the power control based on "specific subframes" can adaptively adjust according to factors such as channel change speed, UE moving speed and interface interacting supporting capability. Data of the victim macro UEs can be scheduled only on the specific subframes of the macro eNB while the CSG UEs might be scheduled to all the subframes of the HeNB. The selection of specific subframes is controlled by network operation with coordinated negotiation between the two involved eNBs. Considering the latency of coordination information exchanging, an X2 interface between the two involved eNBs is preferable, but not mandatory.

It can be seen from the above description that by applying the present invention, data of the CSG UEs can be scheduled to all the subframes of the HeNB (including specific subframes whose power is configured), which is different from the almost black subframe scheme in the prior art. In the almost black subframe scheme, the closed subframes cannot be scheduled to use under any conditions. Therefore, according to the solution proposed by the present invention, more capacity performance gain can be mined from the CSG UEs. As compared with the current DL transmit power control scheme, the solution provided by the present invention does not simply reduce the scope of wireless coverage, but carries out more intelligent subframe-specific power calibration, so a predicted performance gain can be achieved.

The adaptive subframe-specific power configuration solution proposed by the present invention solves the interference problem in HetNets more flexibly to guarantee the workability of victim UEs, an increased system capacity performance gain can be achieved, and meanwhile backward compatability to legacy UEs can be guaranteed.

The present invention may be implemented by hardware, software, firmware, and their combination. The skilled in the art should know that the present invention may also be embodied in a computer program product set on a signal carrying medium available for any suitable data processing system. Such signal carrying medium may be a transmission medium or a recordable medium for machine-readable information, including a magnetic medium, an optical medium, or other suitable medium. Examples of recordable mediums include: a floppy disk or magnetic disk in a hard disk driver, an optical disk for a CD driver, a magnetic tape, and other medium that can be contemplated by the skilled in the art. The skilled in the art should understand that any communication device with an appropriate programming apparatus can implement steps of the method of the present invention as embodied in the program product.

It is to be understood from the foregoing description that modifications and alterations may be made to the respective embodiments of the present invention without departing from the spirit of the present invention. The description in the present specification is intended to be illustrative and not limiting. The scope of the present invention is limited by the appended claims only.

What is claimed is:

1. An adaptive power configuration method for base stations with coverage areas that at least partially overlap in a HetNet, the method comprising:

scheduling specific subframes of a serving base station and an aggressor base station in a HetNet, the serving and aggressor base stations having coverage areas that at least partially overlap, the serving base station serving at least one victim UE, the aggressor base station serving at least one non-victim UE, wherein the serving base station, the at least one victim UE, the aggressor base station, and the at least one non-victim UE are arranged and configured in the HetNet such that the at least one victim UE is interfered by the aggressor base station;

receiving interference information generated by the at least one victim UE at the serving base station, the interference information reporting interference caused by the aggressor base station at the at least one victim UE; and transferring the interference information reported by the at least one victim UE from the serving base station to the aggressor base station;

wherein the aggressor base station is configured to calculate an adaptive maximum transmit power P for signals transmitted by the aggressor base station during the specific subframes based at least in part on the interference information generated by the at least one victim UE and received from the serving base station, wherein the adaptive maximum transmit power P is in a range from 0 to Pmax, where Pmax is a maximal transmit power of the aggressor base station, wherein the adaptive maximum transmit power P is calculated by the aggressor base station after receiving the interference information generated by the at least one victim UE from the serving base station;

wherein the aggressor base station is configured to transmit signals for reception by the at least one non-victim UE during the specific subframes at the adaptive maximum transmit power P calculated by the aggressor base station after receiving the interference information generated by the at least one victim UE from the serving base station.

2. The method according to claim 1, further comprising:
at the serving base station, calculating the adaptive maximum transmit power P for signals transmitted by the aggressor base station during the specific subframes; and
transferring a power configuration indication of the adaptive maximum transmit power P from the serving base station to the aggressor base station.

3. The method according to claim 1, wherein, the specific subframes are coordinated and controlled by the aggressor base station and the serving base station.

4. The method according to claim 1, wherein, criteria for calculating the adaptive maximum transmit power P for signals transmitted by the aggressor base station during the specific subframes includes at least one of keeping the at least one victim UE normally workable, obtaining a reliable control channel reception, and enabling the at least one non-victim UE to obtain a high performance gain.

5. The method according to claim 1, wherein, information interaction is carried out between the aggressor base station and the serving base station via an X2 interface.

6. The method according to claim 1, wherein, the aggressor base station is a HeNB, and the serving base station is a macro eNB.

7. The method according to claim 1, wherein, the aggressor base station is a macro eNB, and the serving base station is a pico eNB.

8. A serving base station for operation in a HetNet, the serving base station comprising:
a receiving unit configured to receive interference information from at least one victim UE in conjunction with the serving base station and an aggressor base station operating in a HetNet, the interference information reporting interference caused by the aggressor base station at the at least one victim UE, wherein the serving and aggressor base stations are arranged and configured such that their respective coverage areas at least partially overlap, such that the serving base station serves the at least one victim UE, such that the aggressor base station serves at least one non-victim UE, and such that specific subframes in the serving and aggressor base stations are scheduled for transmissions to the at least one victim UE and the at least one non-victim UE; and
a transmitting unit configured to transfer the interference information reported by the at least one victim UE to the aggressor base station;
wherein the aggressor base station is configured to calculate an adaptive maximum transmit power P for signals transmitted by the aggressor base station during the specific subframes based at least in part on the interference information generated by the at least one victim UE and received from the serving base station, wherein the adaptive maximum transmit power P is in a range from 0 to Pmax, where Pmax is a maximal transmit power of the aggressor base station, wherein the adaptive maximum transmit power P is calculated by the aggressor base station after receiving the interference information generated by the at least one victim UE from the serving base station;
wherein the aggressor base station is configured to transmit signals for reception by the at least one non-victim UE during the specific subframes at the adaptive maximum transmit power P calculated by the aggressor base station after receiving the interference information generated by the at least one victim UE from the serving base station.

9. The serving base station according to claim 8, wherein, criteria for calculating the adaptive maximum transmit power P for signals transmitted by the aggressor base station during the specific subframes includes at least one of keeping the at least one victim UE normally workable, obtaining a reliable control channel reception, and meanwhile enabling the at least one non-victim UE to obtain a high performance gain.

10. The serving base station according to claim 8, wherein the aggressor base station is a HeNB and the serving base station is a macro eNB or the aggressor base station is a macro eNB and the serving base station is a pico eNB.

11. The serving base station according to claim 8, wherein information interaction is carried out between the aggressor base station and the serving base station via an X2 interface.

12. An aggressor base station for operation in a HetNet, the aggressor base station comprising:
a receiving unit configured to receive interference information generated by at least one victim UE from a serving base station in conjunction with the serving and aggressor base stations operating in a HetNet, the interference information reporting interference caused by the aggressor base station at the at least one victim UE, wherein the serving and aggressor base stations are arranged and configured such that their respective coverage areas at least partially overlap, such that the serving base station serves the at least one victim UE, such that the aggressor base station serves at least one non-victim UE, and such that specific subframes in the serving and aggressor base stations are scheduled for transmissions to the at least one victim UE and the at least one non-victim UE;
a calculating unit configured to calculate an adaptive maximum transmit power P for signals transmitted by the aggressor base station during the specific subframes based at least in part on the interference information generated by the at least one victim UE and received by the receiving unit of the aggressor base station from the serving base station, wherein the adaptive maximum transmit power P is in a range from 0 to Pmax, where Pmax is a maximal transmit power of the aggressor base station; and
a power adjusting unit configured to adjust transmit power for signals transmitted by the aggressor base station for reception by the at least one non-victim UE during the specific subframes at the adaptive maximum transmit power P calculated by the calculating unit of the aggressor base station after the receiving unit of the aggressor base station received the interference information generated by the at least one victim UE from the serving base station.

13. The aggressor base station according to claim 12, wherein, criteria for calculating the adaptive maximum transmit power P for signals transmitted by the aggressor base station during the specific subframes includes at least one of keeping the at least one victim UE normally workable, obtaining a reliable control channel reception, and meanwhile enabling the at least one non-victim UE to obtain a high performance gain.

14. The aggressor base station according to claim 12, wherein, the receiving unit is configured to receive a power configuration indication of the adaptive maximum transmit power P from the serving base station.

15. The aggressor base station according to claim 12, wherein the serving base station is configured to receive the interference information from the at least one victim UE, calculate the adaptive maximum transmit power P for signals transmitted by the aggressor base station during the specific subframes, and transfer the power configuration indication of the adaptive maximum transmit power P to the aggressor base station.

16. The aggressor base station according to claim 15, further comprising:
   a transmitting unit configured to transmit signals during the specific subframes at the adaptive maximum transmit power P for reception by the at least one non-victim UE in response to receiving the power configuration indication from the serving base station.

17. The aggressor base station according to claim 12, further comprising:
   a transmitting unit configured to transmit signals during the specific subframes at the adaptive maximum transmit power P for reception by the at least one non-victim UE.

18. The aggressor base station according to claim 12, wherein the aggressor base station is a HeNB and the serving base station is a macro eNB or the aggressor base station is a macro eNB and the serving base station is a pico eNB.

19. The aggressor base station according to claim 12, wherein information interaction is carried out between the aggressor base station and the serving base station via an X2 interface.

* * * * *